United States Patent [19]
Stanley et al.

[11] 3,848,832
[45] Nov. 19, 1974

[54] AIRCRAFT ENGINE INSTALLATION

[75] Inventors: Michael Richard Stanley, Federal Way; Lucas James Kimes, Seattle, both of Wash.

[73] Assignee: The Boeing company, Seattle, Wash.

[22] Filed: Mar. 9, 1973

[21] Appl. No.: 339,646

[52] U.S. Cl. .................................. 244/54, 248/5
[51] Int. Cl. ............................................ B64d 27/00
[58] Field of Search............ 244/54, 55, 53 R, 12 D, 244/23 D, 110 B; 248/5

[56] References Cited
UNITED STATES PATENTS

| | | | |
|---|---|---|---|
| 1,723,763 | 8/1929 | Burnelli | 248/5 |
| 3,024,601 | 3/1962 | Nash | 60/229 |
| 3,129,906 | 4/1964 | Peterson | 244/54 |

Primary Examiner—George E. A. Halvosa
Assistant Examiner—Sherman D. Basinger
Attorney, Agent, or Firm—Christensen, O'Connor, Garrison & Havelka

[57] ABSTRACT

The aircraft has an A-frame-like strut cantilevered forward from the leading edge structure of each wing of the same. The transom of the strut is arch-like in configuration and has an engine suspended therefrom, within the inside concave recess thereof. The engine is enclosed in a cylindrical nacelle on the transom, and the strut is upwardly canted from the structure of the wing so as to elevate the transom and the nacelle to a level at which the engine exhausts over the wing.

13 Claims, 6 Drawing Figures

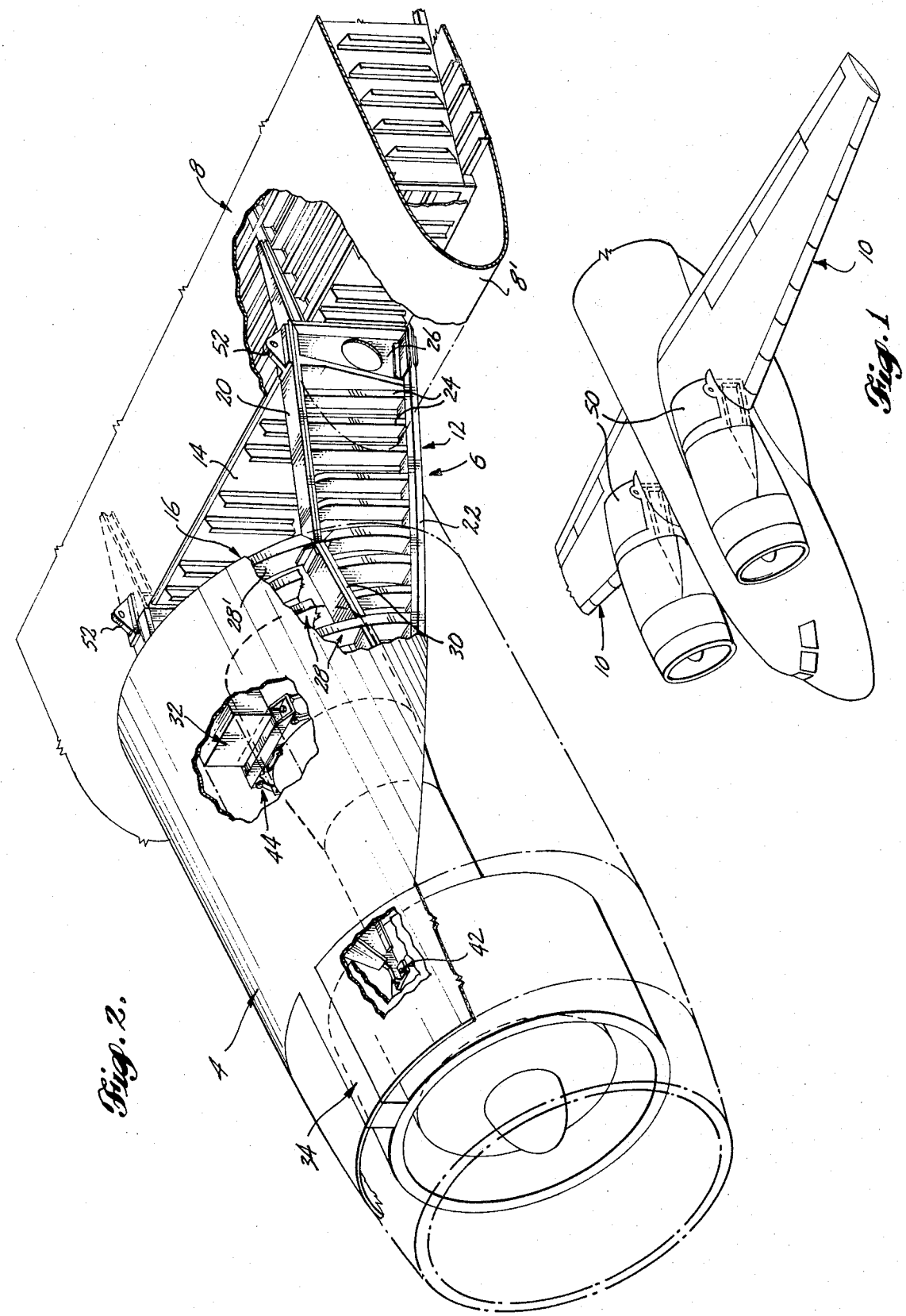

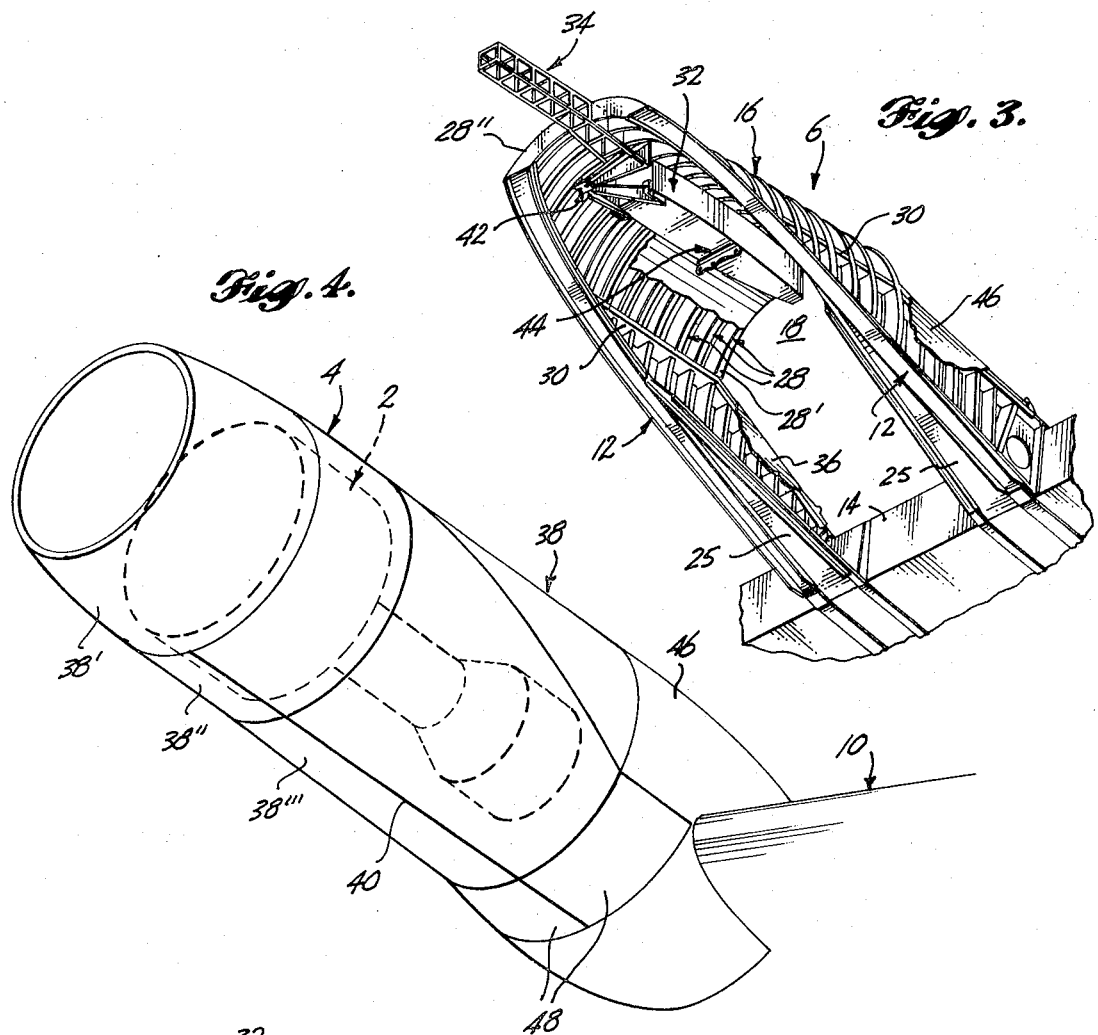
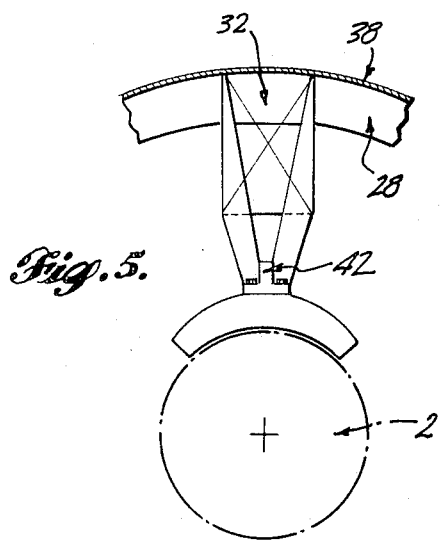
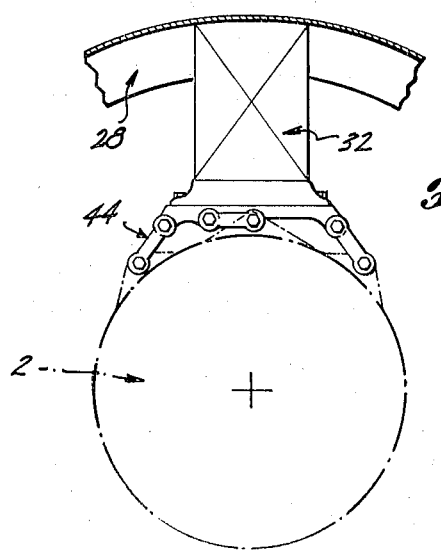

3,848,832

AIRCRAFT ENGINE INSTALLATION

THE INVENTION IN GENERAL

This invention relates to an aircraft engine installation, and in particular, to one in which the aircaraft has an engine on each wing and each engine is supported ahead of the wing at an elevation in which it exhausts over the wing.

According to the invention, the aircraft has an A-frame -like strut cantilevered forward from the leading edge structure of each wing, and the transom is arch-like in configuration and has the engine of that wing suspended therefrom, within the inside concave recess thereof. The engine is enclosed in a cylindrical nacelle on the transom, an d the strut is upwardly canted from the structure of the wing so as to elevate the transom and nacelle to a level at which the engine exhausts over the wing. Preferably moreover, the nacelle surrounds the transom and the transom assumes a part cylindrical outer configuration which mates with the inner configuration of the nacelle at the top. In this way, the transom serves not only as a means of unifying the frame of the strut, and as a gantry for the engine, but also as a show-horn-like hanger for the nacelle, which exposes most of the engine to access from points below the strut, as for example, where the cowling flanking the nacelle is divided into panels which can be swung up from the bottom, to expose the engine in the recess of the transom.

The arrangement also lends itself to the use of mechanical thrust reversers, for example, of the bucket type, since according to the invention, the thrust reverser may be disposed so that the full operative load of the same is effectively carried at the leading edge structure of the wing, where it will not appreciably add to the forward weight of the installation.

BRIEF DESCRIPTION OF THE DRAWINGS

An understanding of these and other features of the invention can be reached by referring to the accompanying drawings which illustrate a presently preferred embodiment of the invention.

In the drawings, FIG. 1 is a part perspective view of an aircraft employing two such engine installations;

FIG. 2 is a part top perspective vies of one installation with certain portions of the skin or cowling removed to reveal structure therebelow;

FIG. 3 is a part bottom perspective view of the installation with the whole of the nacelle and the engine removed to reveal the structure of the strut itself;

FIG. 4 is a more diagrammatic, part bottom perspective view of the installation showing the nacelle and engine as they are carried on the strut;

FIG. 5 is a part cross-sectional schematic view of the forward engine mount; and FIG. 6 is another such view of the rear engine mount.

DESCRIPTION OF THE ILLUSTRATED EMBODIMENTS

Referring to the drawings, it will be seen that the engine 2 of each installation is enclosed within a barrel-(like nacelle 4 which is supported at the forward end of a strut 6 cantilevered from the leading edge structure 8 of the wing 10. The strut 6 comprises a pair of forwardly cantilevered beams 12 which are accommodated in the leading edge 8' of the wing and strapped to the structure at the front spar 14 thereof. It also comprises a transom-like arch assembly 16 which is superposed on the forward ends of the beams 12 so as to interconnect them in the form of a modified A-frame. The engine is suspended within the inside concave recess 18 of the arch 16, and has the nacelle 4 hung thereabout on the arch.

The beams 12 have an upward cant in relation to the chord of the wing, and are composites assembled from pairs of elongated plates 20 and 22, which are superposed in spaced flatwise relationship to one another and interconnected by a series of stud-like webs 24 interposed upright therebetween. In addition the beams have fillet-like shear webs 25 swept back along the inside lengths thereof, which are strapped to the structure 8 of the wing between the rear ends of the beams. The latter ends are reinforced with webbing 26, and as indicated, are bulkheaded onto the front spar 14 of the wing.

The forward ends of the beams merge with the arch assembly, and in so doing, effectively truncate the assembly along an inclined plane coinciding with the bottom plates 22 of the beams. The assembly 16 comprises a series of inverted U-shaped or part cylindrical arcuate ribs 28 which are aligned in spaced relationship to one another along an axis extending chordwise of the wing. A pair of notched purlins 30 are interconnected with the legs of the ribs along each side of the assembly and at a level in which they co-terminate with the upper plates 20 of the beams at the rearmost rib 28' of the assembly. In addition, the ribs are interconnected by a gantry beam 32 which is slung below the ridge of the assembly and has a box framed jib 34 at the forward end thereof, which is cantilevered forwardly from the assembly to a point beyond the forwardmost rib 28" therein.

The interior surfaces of the strut are covered by skin 36. Otherwise, the strut is enclosed in the nacelle. The forward portion of the nacelle has several sections of essentially cylindrical cowling 38 arranged in tandem, the forwardmost 38' of which forms the fan intake, the intermediate 38" of which surrounds the fan, and the rearmost 38'" of which surrounds the engine otherwise. The cowling 38" and 38'" are hinged and divided into side panels which meet one another along a line 40 at the bottom. The panels can be swung open by hand and propped apart while the engine is maintenanced or replaced from below.

The engine is suspended from the gantry beam by a pair of tandem mounting devices 42 and 44, the forward 42 of which takes the form of pylon-like device on the forward end of the beam 32, to which the forward end of the engine is attached. The aft device 44 comprises a multi-linked, tension bolted sling-like device which is clamped about the aft end of the engine in known manner.

The remainder of the nacelle encloses the beams 12 and comprises a section of fixed cowling 46, and a pair of bottom panels 48 which are hinged to open along the same line with the forward portion of the nacelle. The fixed section 46 has a bucket-like cowling member 50 defined therewithin, which is hinged to a pair of trunion mounts 52 on the aft ends of the beams 12 for use as a thrust reverser, as explained in application Ser. No. 339,725, filed on Mar. 9, 1973.

We claim:

1. In combination, a winged aircraft having an A-frame-like strut cantilevered forward from the leading edge structure of each wing thereof, said strut comprising a pair of forwardly cantilevered beams and an inverted U-shaped transom interconnecting the forward end portions of the beams, and an engine for the aircraft suspended from the transom portion of the strut within the inside concave recess of the transom.

2. The combination according to claim 1 wherein the engine is enclosed in a cylindrical nacelle which is carried on the transom.

3. The combination according to claim 2 wherein the strut is upwardly canted from the structure of the wing so as to elevate the transom and the nacelle to a level at which the engine exhausts over the wing.

4. The combination according to claim 2 wherein the nacelle surrounds the transom, and the transom assumes a part cylindrical outer configuration which mates with the inner configuration of the nacelle at the top.

5. The combination according to claim 2 wherein the transom is formed by a cage-like series of arcuate ribs aligned with one another along an axis extending chordwise of the wing.

6. The combination according to claim 5 wherein the strut has an upward cant in relation to the structure of the wing so as to elevate the transom and the nacelle to a level at which the engine exhausts over the wing, and the ribs are truncated in a transverse plane angled to the axis of the series of ribs at the upward cant of the strut.

7. The combination according to claim 6, wherein the beams are cantilevered from the leading edge structure of the wing in the transverse plane of the ribs.

8. The combination according to claim 7 wherein the rearmost rib in the series of ribs, is spaced ahead of the leading edge of the wing, and the forward ends of the beams are bulkheaded into the ends of said ribs, but have portions thereof which extend forward of said rib and interconnect the series of ribs in the transverse plane thereof.

9. The combination according to claim 5 wherein the ribs are interconnected by a gantry beam at the top thereof, and the engine is suspended from the gantry beam.

10. The combination according to claim 9 wherein a portion of the engine is disposed forward of the series of ribs, the gantry beam has a jib extending forward from the forward end thereof, and the nacelle surrounds the transom and has a section at the forward end thereof which is supported on and about the jib.

11. The combination according to claim 2 wherein the nacelle has a bucket-like thrust reverser cowling member defined therewithin, adjacent the leading edge of the wing.

12. In combination, a winged aircraft having an A-frame-like strut cantilevered forward from the leading edge structure of each wing thereof, said strut comprising a pair of forwardly cantilevered beams and an inverted U-shaped transom interconnecting the forward end portions of the beams, a nacelle carried on the transom, and an engine for the aircraft enclosed within the nacelle, and suspended from the strut below the transom and the upper side of the nacelle, within the inside concave recess of the transom.

13. The combination according to claim 12 wherein the nacelle surrounds the transom and the engine is suspended from the strut independently of the nacelle.

* * * * *